United States Patent [19]

Shea

[11] Patent Number: 4,880,144
[45] Date of Patent: Nov. 14, 1989

[54] CONSOLE FOR HOLDING AND HOUSING CLEANING AND LUBRICATION EQUIPMENT

[75] Inventor: Robert F. Shea, Florissant, Mo.

[73] Assignee: McNeil (Ohio) Corporation, St. Paul, Minn.

[21] Appl. No.: 253,568

[22] Filed: Oct. 5, 1988

[51] Int. Cl.$^4$ .......................... B67D 5/64; B67D 5/06
[52] U.S. Cl. .................................... 222/173; 222/192; 222/608; 184/1.5; 15/339; 312/223
[58] Field of Search ............................ 15/339; 184/1.5; 222/173, 192, 608; 312/223; D32/21, 22; D15/9.1, 9.2, 150, 151

[56] References Cited

U.S. PATENT DOCUMENTS

| | | | |
|---|---|---|---|
| 2,317,956 | 4/1943 | Eichner | 222/173 |
| 2,594,779 | 4/1952 | Huffman | 184/1.5 |
| 3,514,171 | 5/1970 | McGaha | 312/223 |
| 3,535,730 | 10/1970 | McClure | 15/339 |
| 4,036,346 | 7/1977 | Livingston | 15/339 |
| 4,095,673 | 6/1978 | Takeuchi | 184/1.5 |
| 4,194,262 | 3/1980 | Finley et al. | 15/339 |

*Primary Examiner*—Joseph J. Rolla
*Assistant Examiner*—Steven M. Reiss
*Attorney, Agent, or Firm*—Senniger, Powers, Leavitt and Roedel

[57] ABSTRACT

A console unit for holding and housing a plurality of lubricant dispensers, lubricator hoses attached to the dispensers, and one or more vacuum units on rollers. The console unit includes a podium-like structure having a front wall, two side walls, a top wall and an open bottom. The console has a lubricator hose housing attached to the front wall of the podium-like structure which has a front wall spaced forward from the front wall of the podium-like structure, a top wall having apertures therein, and side walls. The console unit includes a bracket for releasably holding the dispensers mounted on the front wall of the podium-like structure above the top wall of the hose housing with the lubricator hoses extending down from the dispensers through the apertures in the top wall of the hose housing. The console unit further includes a lower compartment in the podium-like structure for housing one or more vacuum units. The compartment is partially defined by the front and side walls of the podium-like structure and by the open bottom of the podium-like structure. A vacuum unit can be rolled in and out of the compartment along the surface on which the podium-like structure rests.

12 Claims, 2 Drawing Sheets

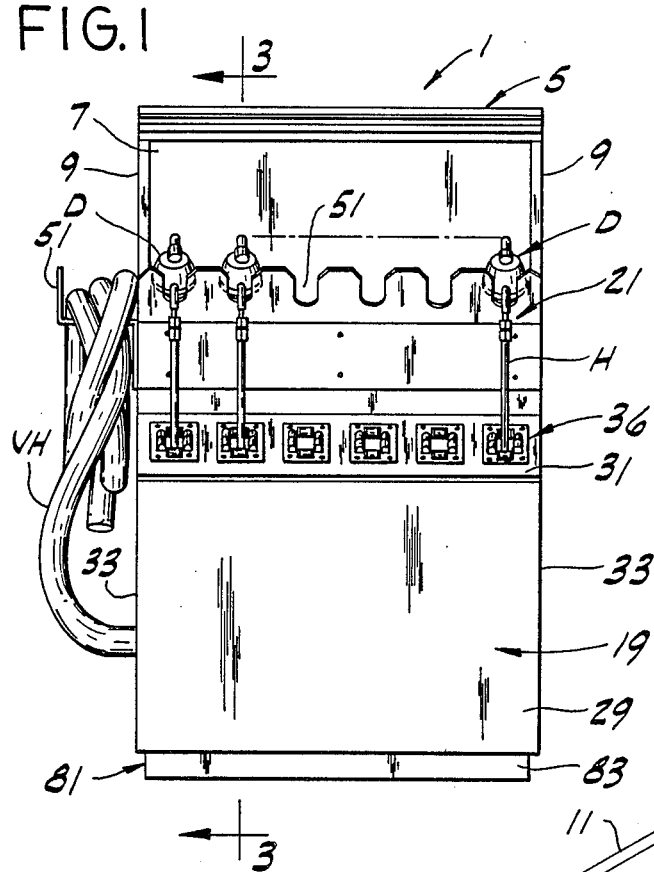
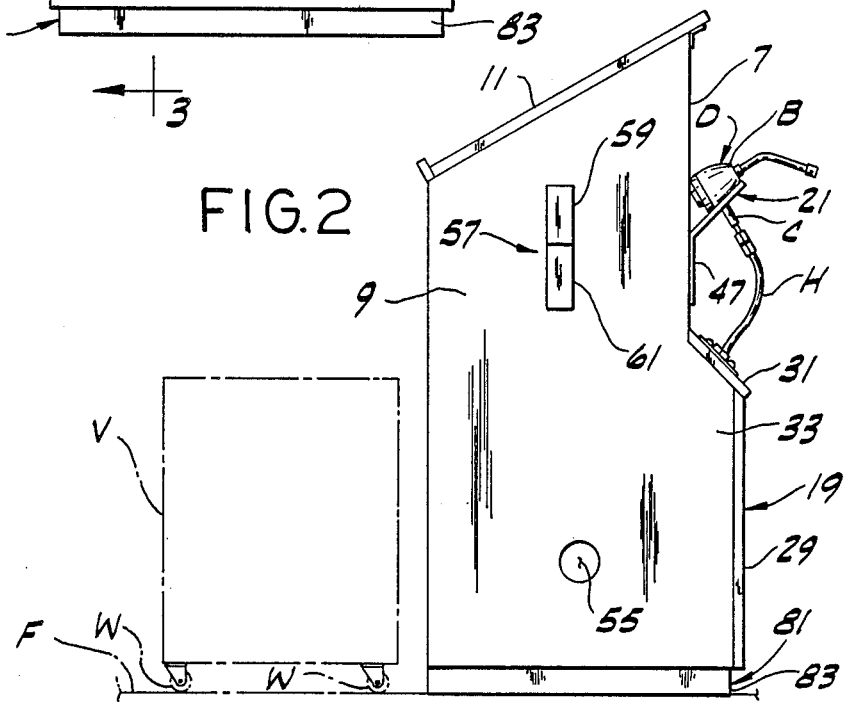

4,880,144

CONSOLE FOR HOLDING AND HOUSING CLEANING AND LUBRICATION EQUIPMENT

BACKGROUND OF THE INVENTION

This invention relates to a console unit for holding and housing a plurality of lubricant dispensers, lubricator hoses attached to the dispensers, and one or more vacuum units on rollers.

In recent years, there has been a proliferation of businesses offering primarily routine maintenance services for cars and trucks. These services include changing the oil, lubricating the chassis and checking other fluids such as brake fluid. In addition, the passenger compartment is vacuumed. These businesses emphasize the speed at which all of these services are completed. The services offered are valuable because they allow routine vehicle maintenance to be carried out quickly and affordably, making it much easier to keep personal and business cars and trucks in the best working condition.

It is generally known that lubricant dispensers, such as grease guns, are necessary for certain lubrication services on vehicles. Self contained dispensers are available, but are either bulky or carry only a relatively small amount of lubricant. In either case, time and labor must be expended, either in maneuvering the bulky unit into position, or in refilling the smaller unit. Therefore, dispensers attached by a length of hose to a large lubricant supply are preferred in the business described above because they are lightweight and yet do not require frequent refilling.

Clearly, there is a need for time and labor saving devices for organizing and manipulating the above described equipment, specifically the dispensers and the vacuum cleaner. In the absence of a centralized location for theses items, time must be spent walking to different areas of the service floor to retrieve them when they are required. Even if the equipment is placed in one location, it becomes disorganized such that equipment must be disentangled or otherwise moved so that the desired piece of equipment may be picked up. Further, lubricant dispensers attached to hoses pose a safety hazard if they are left lying on the floor of the service area. The dispenser hoses, vacuum cleaner hoses and vacuum cleaner motor housings are themselves exposed to potential damage as they sit unprotected in the service area.

SUMMARY OF THE INVENTION

Among the several objects of the invention may be noted the provision of a console for holding lubricant dispensers, and housing lubricator hoses and one or more vacuum cleaners. Time is saved by having these necessary devices in one location for easy access when servicing a vehicle. Housing the vacuum cleaner protects it from potential damage such as being struck by falling tools or from being struck by a vehicle in the service area. Similarly, the lubricator hoses are protected from damage while they are not being used. Another object of the invention is to provide, in combination with a housing for the lubricator hoses and vacuum cleaner, a bracket for holding the dispensers so that they may be easily reached and to avoid tangling the lubricator hoses. Similarly, a hanger for holding a coiled length of vacuum hose is provided.

Briefly described, the present invention is directed to a console unit for holding and housing a plurality of lubricant dispensers, lubricator hoses attached to the dispensers, and one or more vacuum units on rollers. The console unit comprises a podium-like structure having a front wall, two side walls, a top wall and an open bottom. The console also includes a lubricator hose housing attached to the front wall of the podium-like structure which has a front wall spaced forward from the front wall of the podium-like structure, a top wall having aperture means therein, and side walls. The console unit also includes means for releasably holding the dispensers on the front wall of the podium-like structure above the top wall of the hose housing. The lubricator hoses extend down from the dispensers held in the holding means through the aperture means in the top wall of the lubricator hose housing. There is a lower compartment in the podium-like structure for housing one or more vacuum units. The lower compartment is partially defined by the front and side walls of the podium-like structure and the open bottom of the podium-like structure. A vacuum unit can be rolled in and out of the compartment along the surface on which the podium-like structure rests.

Other objects and features will be in part apparent and in part pointed out hereinafter.

BRIEF DESCRIPTION OF THE DRAWINGS

FIG. 1 is a front view of the console unit of the present invention;

FIG. 2 is a side elevation of the console unit. A vacuum unit rolled out of the lower compartment is shown in phantom.

Corresponding reference characters indicate corresponding parts throughout the several views of the drawings.

DESCRIPTION OF A PREFERRED EMBODIMENT

Figure 3:
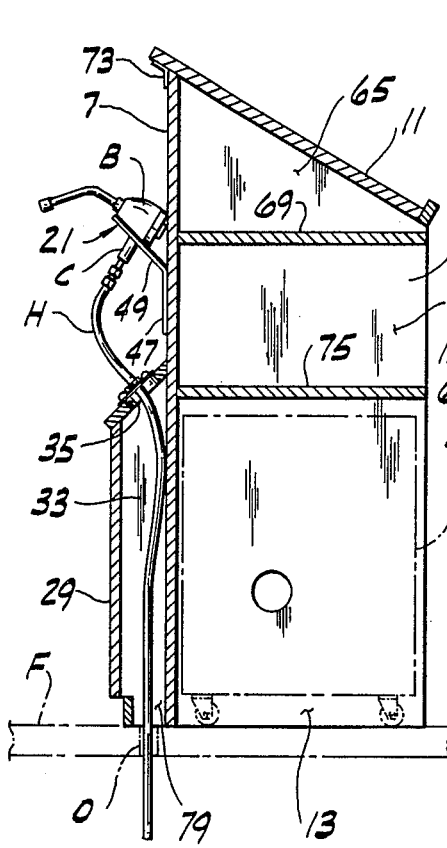
FIG. 3 is a vertical section taken on line 3—3 of FIG. 1.
Figure 5:
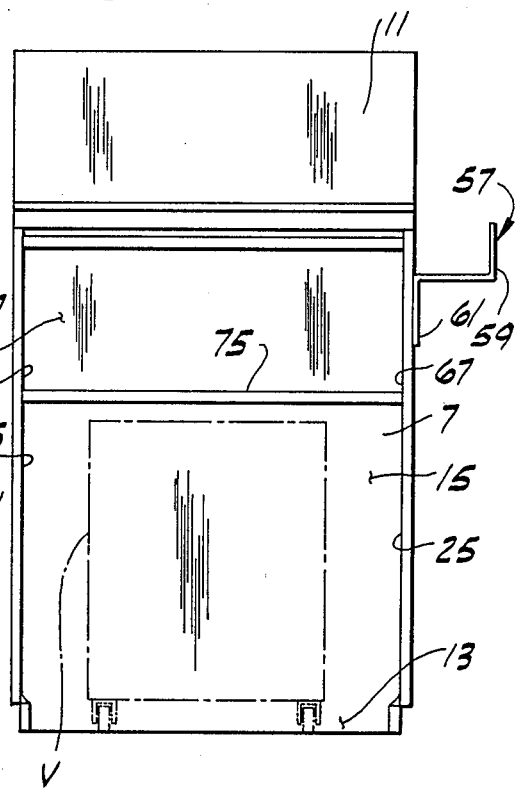
FIG. 5 is a rear view of the console unit with the vacuum unit shown in phantom.
Figure 4:
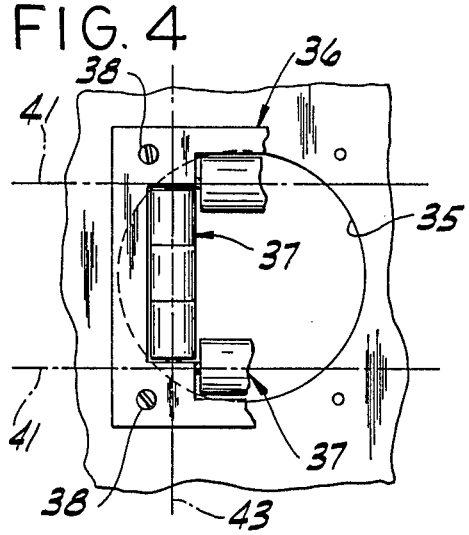
FIG. 4 is an enlarged plan view of a portion of FIG. 1 showing the roller assembly.

Referring now to the drawings, there is indicated generally at 1 a console unit for holding lubricant dispensers generally designated D and a vacuum unit hose VH, and housing lubricator hoses H and a vacuum unit V. The console unit comprises a podium-like structure generally designated 5 having a front wall 7, two side walls 9, a top wall 11, an open bottom 13, and an open back 15. The top wall 11 slopes downward from its intersection with the front wall 7 to its intersection with the back edges of the side walls 9. The console 1 also includes a lubricator hose housing indicated generally at 19 mounted on the front wall 7 of the podium-like structure 5. Means in the form of a bracket generally designated at 21 is mounted on the front wall 7 above the housing 19 for releasably holding the dispensers D. A lower compartment 25 in the console unit is defined by the front wall 7, side walls 9 and open bottom 13. The vacuum unit V has wheels W and may be rolled in an out of the lower compartment 25 through the open back 15 along the floor F on which the console unit 1 stands.

The lubricator hose housing 19 comprises a front wall 29 spaced forward from the front wall 7 of the podium-like structure 5, a top wall 31 and side walls 33 constituted by extensions of the side walls 9 of the structure 5. The top wall 31 slopes downward in a forward direction from the front wall 7 of structure 5. The top wall 31 has circular openings 35 (constituting aperture means) through it which are large enough to provide a passage for the lubricator hoses H to and from the lubricator hose housing 19. A roller assembly generally designated 36 is mounted on the top wall 31 over each of the openings 35. The assembly 36 comprises two pairs of oppositely disposed rollers 37 attached to a frame secured by screws 38 to the top wall 31 of the housing. The rollers 37 are arranged in generally square formation around the opening 35, the axes 41 of a first pair of rollers extending in generally side-to-side direction with respect to the housing 19, and the axes 43 of the other pair of rollers extending generally at right angles to the axes 41 of the first pair. The rollers 37 are positioned in the hole 35 in the top wall 31 and their axes of rotation 41, 43 all lie in a plane parallel to the top wall 31. Each lubricator hose H passes between the rollers 37 and is bracketed on all sides by the rolling surfaces of the rollers 37. When the dispenser D is removed from its bracket 21 and pulled away from the console unit 1, moving generally in a plane parallel to the floor F, the lubricator hose H will engage one or more of the rollers 37. The resulting force, caused by the frictional engagement of lubricator hose H and the roller 37, applied at a distance from the roller's axis of rotation 41, 43 causes the roller 37 to turn with little frictional resistance. The extension and retraction of the hose from the housing 19 is thereby facilitated.

Each dispenser D shown in the drawings has a body B and a handle C extending down from the body B for connection at its lower end with a respective lubricator hose H. The bracket 21 mounted on the front wall 7 of the structure 5 has a generally planar mounting portion 47 attached to the front wall 7, and a generally planar support portion 49 sloping upwardly and forwardly from the mounting portion 47. There are notches 51 comprising U-shaped recesses in the support portion, with the mouth of each "U" at the upwardmost and forwardmost edge of the support portion 49. The notches 51 have a width less than that of the dispenser body B, but greater than the diameter of the dispenser handle C. The dispenser D is placed in the bracket 21 by positioning the body B on the upper surface of the support portion 47 directly over a notch 51, with the handle H extending down through the notch 51. As shown in FIGS. 2 and 3, the support portion 49 and the front wall 7 of structure 5 form a V-shaped cradle for the dispensers D. The slope of the support portion 49 causes the dispensers D to gravitate toward the bottom of the notch 51 and against the front wall 7, thereby preventing the dispensers D from sliding out of the notch 51 unless one is picked up and moved forward from the front wall 7 over the upwardmost and forwardmost edge of the support portion 49.

The vacuum unit V includes a length of hose VH attachable at one end to the vacuum unit V. The hose passes through a hole 55 in one side wall 9 of the structure 5, the hose VH being of sufficient length to service a vehicle at some distance away from the console unit 1. A hanger indicated generally at 57 is attached to the side wall 9 above the hole 55. The hanger has an L-shaped portion 59 projecting out from the side wall 9 around which the hose VH may be coiled when not in use so that it does not constitute a safety hazard or become damaged while lying on the floor F. The hanger 57 also has a mounting portion 61 which is attached to the side wall 9.

The podium-like structure 5 has an upper wedge-shaped compartment 65 and a middle compartment 67. The upper compartment 65 is partially defined by the top wall 11, the front wall 7, and the side walls 9. The upper compartment 65 is further defined by an upper shelf 69 extending horizontally between the side walls 9 of the structure 5. Suitable brackets (not shown) secure the shelf in position. The top wall 11 is attached by a hinge 73 to the outer face of the front wall 7 so that it will pivot about an axis generally parallel and in closely spaced relationship with the intersection of the top wall 11 with the front wall 7 between an open position and a closed position. In the open position, access is provided to the upper compartment 65. The compartment serves as storage for other items used in servicing vehicles or for records or forms used by a vehicle servicing business.

The middle compartment 67 is defined by the front wall 7 and side walls 9, the upper shelf 69 and a lower shelf 75. The lower shelf extends horizontally between the side walls 9 and is suitably supported by brackets (not shown) on side. The lower shelf 75 defines the top wall of the lower compartment 25. The middle compartment 67 is accessed through the open back 15 of the podium-like structure 5 and may also provide storage as described above.

The lubricator hose housing 19 has an open bottom 79 so that the hoses H may pass out of the housing 19 to a supply of lubricant (not shown). For example, the hoses H may pass through an opening O in the floor F to a lubricant supply is located below the floor F. The front wall 29 and side walls 33 of the lubricator hose housing 19 extend vertically downward to the plane of the open bottom 13 of the structure 5, the arrangement being such that the housing 19 engages the floor F so that no part of a lubricator hose H is exposed in the vehicle servicing area except that extending from the openings 35 in the top wall 31 of the lubricator hose housing 19. The lower portion 81 of the lubricator hose housing 19 just above the floor F is offset inwardly from the upper part of the lubricator hose housing 19. However, the front wall 83 of the offset portion 81 remains spaced forward from the front wall 7 of the structure 5.

In view of the above, it will be seen that the several objects of the invention are achieved and other advantageous results attained.

As various changes could be made in the above constructions without departing from the scope of the invention , it is intended that all matter contained in the above description or shown in the accompanying drawings shall be interpreted as illustrative and not in a limiting sense.

What is claimed is:

1. A console unit for holding and housing a plurality of lubricant dispensers, lubricator holes attached to the dispensers, and one or more vacuum units on rollers, comprising:

a podium-like structure having a front wall, two side walls, a top wall and an open bottom;

a lubricator hose housing attached to the front wall of the podium-like structure, having a front wall-spaced forward from the front wall of the podium-like structure, a top wall with aperture means therein, and side walls;

means for releasably holding said dispensers on the front wall of the podium-like structure above the top wall of the hose housing with the lubricator hoses extending down from the dispensers through said aperture means in the top wall of said hose housing; and a lower compartment in the podium-like structure housing said one or more vacuum units, said lower compartment being partially defined by the front and side walls of the podium-like structure and the open bottom of the podium-like structure whereby said vacuum unit can be rolled in and out of the compartment along a surface on which the podium-like structure rests.

2. A console unit as set forth in claim 1 wherein said aperture means comprises a separate aperture in the top wall of the hose housing for each lubricator hose, and a roller assembly associated with each apertured having oppositely disposed rollers engageable with a respective lubricator hose for facilitating extension of the hose from the hose housing and retraction of the hose back into the hose housing.

3. A console unit as set forth in claim 1 wherein said holding means comprises a bracket attached to the front wall of the podium-like structure above the lubricator hose housing.

4. A console unit as set forth in claim 3 wherein the bracket comprises a generally planar mounting portion for mounting the bracket flush on said front wall.

5. A console unit as set forth in claim 4 wherein the bracket further comprises a generally planar support portion sloping upwardly and forwardly from said planar mounting portion, said support portion having a plurality of notches therein for holding the lubricant dispensers.

6. A console unit as set forth in claim 1 wherein, for each vacuum hose associated with said vacuum unit in the lower compartment, there is an opening in a wall of the podium-like structure providing a passage for the vacuum hose to and from the lower compartment.

7. A console unit as set forth in claim 1 wherein, for each vacuum hose associated with said vacuum unit in the lower compartment, there is a hanger mounted on a wall of the podium-like structure or hose housing for holding a coiled length of vacuum hose.

8. A console unit as set forth in claim 1 wherein the podium-like structure further comprises an upper compartment defined by an upper, generally horizontal shelf extending between the side walls of the podium-like structure, the front and side walls of the podium-like structure, and the top wall of the podium-like structure, said top wall being hinged to said front wall for pivoting about a generally horizontal axis generally at the intersection of said top wall and said front wall between a closed position and an open position allowing access to the upper compartment.

9. A console unit as set forth in claim 8 wherein the podium-like structure further comprises one or more middle compartments, each defined by the front and side walls of the podium-like structure, an upper generally horizontal shelf extending between the side walls of the podium-like structure, and a lower generally horizontal shelf extending between the side walls of the podium-like structure.

10. A console unit as set forth in claim 9 wherein the lower compartment is further defined by said lower shelf.

11. A console unit as set forth in claim 1 wherein the lubricator hose housing has an open bottom for exit of the lubricator hoses for connection to a supply of lubricant.

12. A console unit as set forth in claim 11 wherein the front and side walls defining the lubricator hose housing extend vertically downward to a plane containing the bottom of the podium-like structure.

* * * * *

UNITED STATES PATENT AND TRADEMARK OFFICE
CERTIFICATE OF CORRECTION

PATENT NO. : 4,880,144

DATED : November 14, 1989

INVENTOR(S) : Robert F. Shea

It is certified that error appears in the above-identified patent and that said Letters Patent is hereby corrected as shown below:

Column 4, line 55, "lubricator holes", should read ---lubricator hoses---.

Column 5, line 14, "each apertured", should read ---each aperture---.

Signed and Sealed this

Fifth Day of February, 1991

Attest:

HARRY F. MANBECK, JR.

Attesting Officer

Commissioner of Patents and Trademarks